Patented Jan. 24, 1950

2,495,220

UNITED STATES PATENT OFFICE 2,495,220

METHOD OF PREPARING PHOSPHATE ESTERS

Alan Bell, Kingsport, Tenn., assignor to Eastman Kodak Company, Rochester, N. Y., a corporation of New Jersey No Drawing. Application December 26, 1946, Serial No. 718,612

7 Claims. (Cl. 260—461)

This invention relates to compounds useful for insecticidal purposes prepared by reacting trialkyl or triaryl phosphates or thiophosphates with sulfur acid halides.

Insecticides ordinarily divide themselves up into those of the contact type, the most commonly known members of which are nicotine sulfate and pyrethrum and those which poison by ingestion thereof. In recent years new materials of the contact insecticidal type have been developed, the most commonly known of these new materials being "DDT" and "Bladan," the latter a German development. As for insecticides of the ingested type, the most commonly known at the present time are the arsenic compounds, such as lead arsenate, which leave poisonous residues upon the material to which they are applied.

One object of my invention is to provide a new type of phosphorus compounds which have greatly improved properties as contact insecticides. Another object of my invention is to provide a new type of phosphorus compounds which not only are useful as contact insecticides but also are toxic when ingested but which do not leave a poisonous residue upon the material to which they have been applied. A further object of my invention is to provide a process for making phosphorus compounds which are useful for killing insects, rodents, etc., by reacting organic phosphates with sulfur acid halides.

I have found that the residues resulting from the reaction of organic phosphates with sulfur acid chlorides are useful, both as contact insecticides and as stomach poisons, the toxicity as a contact insecticide being much greater than that of the contact insecticides now employed and also which may be employed without leaving a substantial poisonous residue after a short time upon the materials to which they are applied.

The organic phosphates which may be employed as the starting materials in processes in accordance with my invention are any of the lower alkyl or aryl phosphates or thiophosphates. The phosphates of the lower alcohols, such as triethyl phosphate, have been found to be particularly useful for this purpose. A triethyl phosphate useful as the starting material in the preparation of insecticides in accordance with my invention is that prepared by the process described and claimed in U. S. Patent No. 2,407,279, dated September 10, 1946, of Hull and Snodgrass. Other compounds which may be employed as the starting material are tripropyl phosphate, tributyl phosphate, triamyl phosphate, trimethyl phosphate, or tri-2-ethyl hexyl phosphate or, in other words, any of the trialkyl phosphates, the alkyl groups of which have not more than eight carbon atoms. If desired, trialkyl phosphates in which the alkyl groups have substituents thereon, such as chlorine or alkoxy groups, or compounds in which the halogen is linked directly to the P may be employed to prepare materials having effective toxic properties by the process described herein.

The lower aryl phosphates, such as triphenyl or tricresyl phosphate, the mixed alkyl phosphates, such as ethyl propyl, or ethyl butyl phosphates, the alkyl aryl phosphates, such as ethyl phenyl phosphate, or the thiophosphates of any of the alkyl or aryl groups listed herein may be employed if desired.

The compounds which may be reacted with the alkyl or aryl phosphates or thiophosphates to produce toxic materials in accordance with my invention are the sulfur acid halides, particularly thionyl chloride, sulfuryl chloride, sulfur monochloride, thionyl bromide, or sulfuryl bromide.

The reaction of triethyl phosphate with thionyl chloride is as follows:

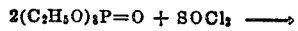

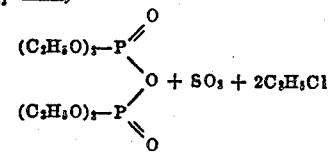

As the triethyl phosphate is used in a double molar amount to the sulfur acid chloride, it is preferred that it be employed in that proportion to prepare the tetraethyl pyrophosphate having toxic properties produced in accordance with my invention. The reaction is promoted by the application of heat, it being usually desirable to heat the mixture of the reactants to at least an 80° C. temperature to make the reaction go. If the reaction proceeds vigorously, cooling may be desirable to retard the reaction. The reaction may be carried out by maintaining the temperature at 80° C. or the temperature may be allowed to proceed upwards to a temperature, such as 140° C., 160° C. or even more, although greatly elevated temperatures are unnecessary and often require enclosed conditions, such as an autoclave. The use of a higher temperature does shorten the reaction time, but it also increases the chances of decomposition of the product prepared. As may be seen from the above equation, alkyl halide and SO₂ are formed during the course of the reaction. As the reaction is carried out at an elevated temperature, the ethyl halide and SO₂ are substantially completely driven off during the course of the reaction so that there remains a residue essentially consisting of tetra alkyl pyrophosphate or tetra alkyl pyro thiophosphate which is useful directly as an insecticidal material. It is preferred that the residue be employed as it is obtained as refining of this residue may result in a decrease of insecticidal properties, particularly if the material is distilled at elevated temperatures. However, distillation under reduced pressure may be employed in order to minimize decomposition or other change in the insecticide. By such distillation diluents may be removed and a more concentrated product obtained. In carrying out the reaction the temperature to be employed is a matter of selection by the individual operator, depending upon whether speed of reaction or low decomposition of product is desired. The temperatures specified in the examples have been found to be quite suitable, and it is preferred to operate the reaction ordinarily within these temperatures.

The following examples illustrate my invention:

*Example 1.*—80 parts (approximately .7 mols.) of thionyl chloride were mixed with 255 parts (approximately 1.4 mols.) of triethyl phosphate and the mass was heated. The reaction began at about 80° C., and the temperature was slowly raised to 140–145° C. where it was maintained for about ½ hour. During the reaction substantially theoretical amounts of ethyl chloride and sulfur dioxide were evolved. 221 parts of a liquid which appeared to consist essentially of tetra ethyl pyrophosphate were obtained. The liquid was soluble in water and most organic solvents. When purified, the product exhibited the following properties:

$$d_4^{20} = 1.14-1.175$$
$$\eta_D^{20} = 1.414-1.418$$
Phosphorus 19–21%
Sulfur 0%
Chlorine 0%

*Example 2.*—60 parts (approximately .5 mol.) of thionyl chloride were mixed with 280 parts (approximately 1.0 mol.) of tributyl phosphate and the mass was heated. The temperature was maintained at 110–120° C. for about two hours and sulfur dioxide was evolved during the reaction. The butyl chloride which had formed and was not evolved was removed by heating under a slightly reduced pressure. 225 parts of colorless liquid essentially comprised of tetra butyl pyrophosphate were formed, which liquid was insoluble in water but was soluble in the common solvents.

*Example 3.*—104 parts (approximately .77 mol.) of sulfuryl chloride were mixed with 307 parts (approximately 1.7 mols.) of triethyl phosphate, and the mixture was slowly heated to 140–150° C. where it was maintained until gas evolution had practically ceased. By this time the ethyl chloride and a substantial part of the sulfur in the form of oxides of sulfur had been evolved from the mass. 285 parts of a liquid believed to be comprised essentially of tetraethyl pyrophosphate were formed, which liquid was soluble in water and most organic solvents. If this reaction is carried out at 90–100° C., ethylchloride is evolved, but the reaction product containing sulfur is for the most part stable and the product is comprised essentially of di (diethylphospho) sulfate which also has insecticidal value.

*Example 4.*—60 parts of thionyl chloride were mixed with 148 parts of trimethyl phosphate. The reaction began without heating and methyl chloride and SO₂ were evolved in substantially theoretical amounts. The mass was finally heated to 130–135° C. for ½ hour. 150 parts of a light-colored liquid essentially comprised of tetramethyl pyrophosphate were obtained.

*Example 5.*—64.5 parts of tri-isopropyl phosphate were mixed with 17.9 parts of thionyl chloride, and the mass was heated for one hour at 125–130° C. Isopropyl chloride and sulfur dioxide formed and distilled off during the reaction. 53 parts of a brown oil essentially comprised of tetra isopropyl pyrophosphate were obtained.

*Example 6.*—38 parts of diethyl propyl phosphate were mixed with 12 parts of thionyl chloride and the mass was heated to 100–110° C. for ½ hour at the end of which time all of the ethyl chloride, little or no propyl chloride, and SO₂ which had formed were evolved. 30 parts of a brown oil essentially consisting of a tetra alkyl pyrophosphate, the alkyl of which was ethyl and propyl, were obtained.

*Example 7.*—20 parts of triethyl thiophosphate were heated for ½ hour at 110–115° C. with 6 parts of thionyl chloride. A dark-colored liquid essentially consisting of tetraethyl pyro thiophosphate was obtained.

*Example 8.*—58 parts of the tetraethyl pyrophosphate product prepared in Example 1 were mixed with 12 parts of thionyl chloride, and the mass was heated at 110–115° C. for ½ hour. Theoretical amounts of ethyl chloride and sulfur dioxide were evolved. 53 parts of a brown oil were obtained, principally consisting of the product obtained by combining two molecules of the tetraethyl pyrophosphate to give hexaethyl tetra polyphosphate. The hexaethyl tetra polyphosphate so prepared showed itself to be much more toxic than the corresponding compound prepared from triethyl phosphate and phosphorus pentoxide.

The compounds prepared in accordance with my invention are very potent insecticides as compared with the insecticides now available. For example, the liquid obtained by the process of Example 7, when tested against German roaches in a ½ percent concentration, gave a 100 percent kill in 1½ hours, whereas the reaction product of triethyl thiophosphate and POCl₃ which was employed as a check had no effect under the same conditions upon the roaches in a period of 24 hours. A large number of German roaches was dusted with dust containing ½ percent of a residue prepared in accordance with Example 1. A 100 percent kill was obtained in one-half hour.

Like results were obtained using a residue obtained in accordance with the process of Example 3. When German roaches were subjected to a spray of the material as obtained by the process of Example 1 in 1 percent concentration in propyl alcohol-kerosene (4:1), a kill of 80 percent was obtained in 10 minutes. Field tests were conducted with the same residue on beans against the Mexican bean beetle with aqueous sprays (containing a wetting agent) of 1 to 1000 and 1 to 2000. Both sprays killed the larvae which could be seen strewn on the ground 30 minutes after spraying. There was no foliage injury to the beans. At these concentrations these materials show themselves to be about ten times as toxic as DDT.

Products in accordance with my invention also show the characteristic of being stomach poisons and, hence, are useful against many types of animal life. For instance, in a test upon grasshoppers using a residue in accordance with that prepared by the process of Example 1 on wheat bran in ¼ percent strength, a kill of 100 percent was obtained in two hours. Products prepared in accordance with my invention have proved to be effective against plant lice, aphids, spiders, flies, bean beetles, Harlequin bugs, etc., in concentrations as low as 1 part to 2000 parts of water. However, for maximum efficiency this solution must be used within a few hours after its preparation. Solutions, however, in which a non-polar solvent or a combination of non-polar solvents is employed as the dissolving material enable the insecticide to retain its toxicity almost indefinitely. Some of the solvents which are useful in this connection are the lower alcohols, such as methyl, propyl or ethyl, acetone, petroleum distillates, such as kerosene, benzine, Stoddard solvent or the like, chlorinated hydrocarbons, such as carbon tetrachloride or ethylene chloride or aromatic hydrocarbons, such as benzene, toluene, xylene, or mixtures of any of these solvents.

An advantage of these insecticides, when used as stomach poisons, is that they do not have a permanent residual toxicity, the poisonous effect being dissipated after a time. For instance, when a material such as that prepared in accordance with Example 1 is sprayed upon fruits or vegetables, the toxicity of the material has substantially disappeared at the end of 24 hours, thus being markedly advantageous over stomach poisons which are employed at the present time in this respect.

The residues prepared in accordance with my invention are useful as rodenticides, and here again have the advantage that the materials become non-poisonous to humans or other animals after a short time which is not characteristic of many rodenticides which are used.

In the materials prepared by my invention, I have found that the tetra alkyl pyrophosphate residues in which methyl or ethyl constitute the major portion of the alkyl hydrolyze at a faster rate, and therefore lose their toxicity more rapidly when subjected to hydrolyzing conditions, than those in which higher alkyl groups, such as propyl or butyl, are employed. The latter materials, however, are more slowly effective for insecticidal purposes than the tetraethyl pyrophosphates prepared in accordance with my invention. Therefore, it is often desirable for insecticidal purposes to employ a mixture of the lower tetra alkyl pyrophosphates and the higher tetra alkyl pyrophosphates, the lower compounds giving a quick kill and the higher compounds giving the mixture a residual effect. For instance, suitable mixtures which might be employed are mixtures of either ethyl or methyl compounds with the propyl or butyl pyrophosphates. Also useful in this connection are the tetra alkyl pyrophosphates in which part of the alkyl radicals are ethyl and other groups in the compound are propyl or butyl. All of the residues obtained in accordance with the processes described herein, and particularly in the examples, give materials having insecticidal properties.

In the above description I have set forth in particular compounds illustrating my preferred embodiment, namely, the reaction product of alkyl phosphates with thionyl chloride. However, as also referred to in the preceding description, compounds suitable as insecticides may be prepared by reacting alkyl phosphates or other phosphates with other sulfur-containing chlorides as illustrated by the following examples.

Example 9.—In this example the reaction was carried out between sulfur monochloride and triethylphosphate. In this reaction between sulfur monochloride (1 mole) and triethyl phosphate (2 moles) it is preferred that a higher temperature be used than with the other sulfur chlorides. The reaction begins at about 160° C. with evolution of ethyl chloride and deposition of sulfur. 73 parts of triethyl phosphate and 27 parts of sulfur monochloride were heated at 160–170° C. for about two hours until no more ethyl chloride was evolved. If the temperature is raised much beyond this point, the mixture tends to blacken and polymerize. The reaction product is filtered from the deposited sulfur and excess triethylphosphate removed by vacuum distillation. The yield of crude product is 50 parts. It is a water, alcohol and acetone soluble, dark amber-colored liquid.

Example 10.—In accordance with this example rather than employing a trialkyl phosphate a substituted phosphate was employed. That is, 21 parts of diethyl chlorophosphate was reacted with 7½ parts of thionyl chloride. The reaction materials were heated together at about 90° C. to 100° C. for approximately one hour. As in the previously described reactions the ethyl chloride and oxides of sulfur were distilled off. In this particular reaction it is preferred to hold the temperature below 100° C. to minimize polymerization. The resultant product which was useful as an insecticide is believed to be comprised of a dichlor diethylpyrophosphate.

The use of these various compounds as stomach insecticides on grasshoppers is disclosed in my companion copending application S. N. 718,613, filed December 26, 1946.

Therefore, it is apparent from the foregoing that my invention is susceptible of certain variations. Hence, I do not wish to be restricted except insofar as is necessitated by the prior art and the spirit of the appended claims.

I claim:

1. A method of preparing phosphate compounds having useful insecticidal properties which comprises heating to a temperature between 80° C. and 160° C. a reaction mixture consisting essentially of two moles of lower trialkyl phosphate and one mol of thionyl chloride, said heating being sufficient to cause the liberation of approximately one mol of $SO_2$ and two mols of alkyl chloride.

2. The process in accordance with claim 1 in which at least one of the alkyl radicals of the lower trialkyl phosphate is from the group consisting of propyl and butyl.

3. A method of preparing a tetraalkyl pyrophosphate which comprises heating to a temperature between 80° and 160° C. a reaction mixture consisting essentially of two mols of triethyl phosphate and one mol of thionyl chloride, said heating being sufficient to cause the liberation of approximately one mol of $SO_2$ and two mols of alkyl chloride.

4. A method for preparing tetraethyl pyrophosphate which comprises mixing together thionyl chloride and triethyl phosphate to form a liquid reaction mixture consisting essentially of approximately two mols of the triethyl phosphate to one mol of the thionyl chloride, and heating said liquid reaction mixture sufficiently to cause the liberation of approximately all of the sulfur and chlorine of said thionyl chloride as sulfur dioxide and ethyl chloride.

5. A method of preparing phosphate compounds having useful insecticidal properties which comprises heating to a temperature between 80° and 160° C. a reaction mixture consisting essentially of two mols of lower trialkyl phosphate and one mol of a sulfur acid halide from the group consisting of thionyl chloride, sulfuryl chloride, thionyl bromide and sulfuryl bromide, said heating being sufficient to cause the liberation from the recation of approximately all of the sulfur and halogen contained in said sulfur acid halide.

6. A process for preparing a reaction product having useful insecticidal properties which comprises heating a reaction mixture consisting essentially of a phosphate from the group consisting of the lower alkyl phosphates and the lower alkyl thiophosphates, and at least one sulfur acid halide from the group consisting of thionyl chloride, sulfuryl chloride, thionyl bromide and sulfuryl bromide, said phosphate being present in said reaction mixture in a greater molar amount than said acid halide, and said heating being sufficient to cause reaction and to liberate from the reaction a major part of all of the sulfur and halogen contained in said sulfur acid halide.

7. A process in accordance with claim 6 in which the phosphate is triethyl phosphate and the acid halide is thionyl chloride.

ALAN BELL.

REFERENCES CITED

The following references are of record in the file of this patent:

UNITED STATES PATENTS

| Number | Name | Date |
| --- | --- | --- |
| 2,242,260 | Prutton | May 20, 1941 |
| 2,370,786 | Fox | Mar. 6, 1945 |

OTHER REFERENCES

Adler et al., Chemical Industries, vol. 51, October 1942, pages 516, 517.

Chemical and Engineering News, vol. 23, September 10, 1945, pages 1520–1521.

Balarew, "Zeit, anorg. Chem." vol. 99, (1917), page 190.

Mellor, "Modern Inorganic Chemistry" (1939 ed.), page 480.

Hall et al., Ind. and Eng. Chem., vol. 40, No. 4, pages 694–699, April 1948.